Fig. I

INVENTOR
Edward Danner

May 20, 1947.  E. DANNER  2,420,934
MANUFACTURE OF GLASSWARE
Filed Aug. 17, 1943   5 Sheets-Sheet 2
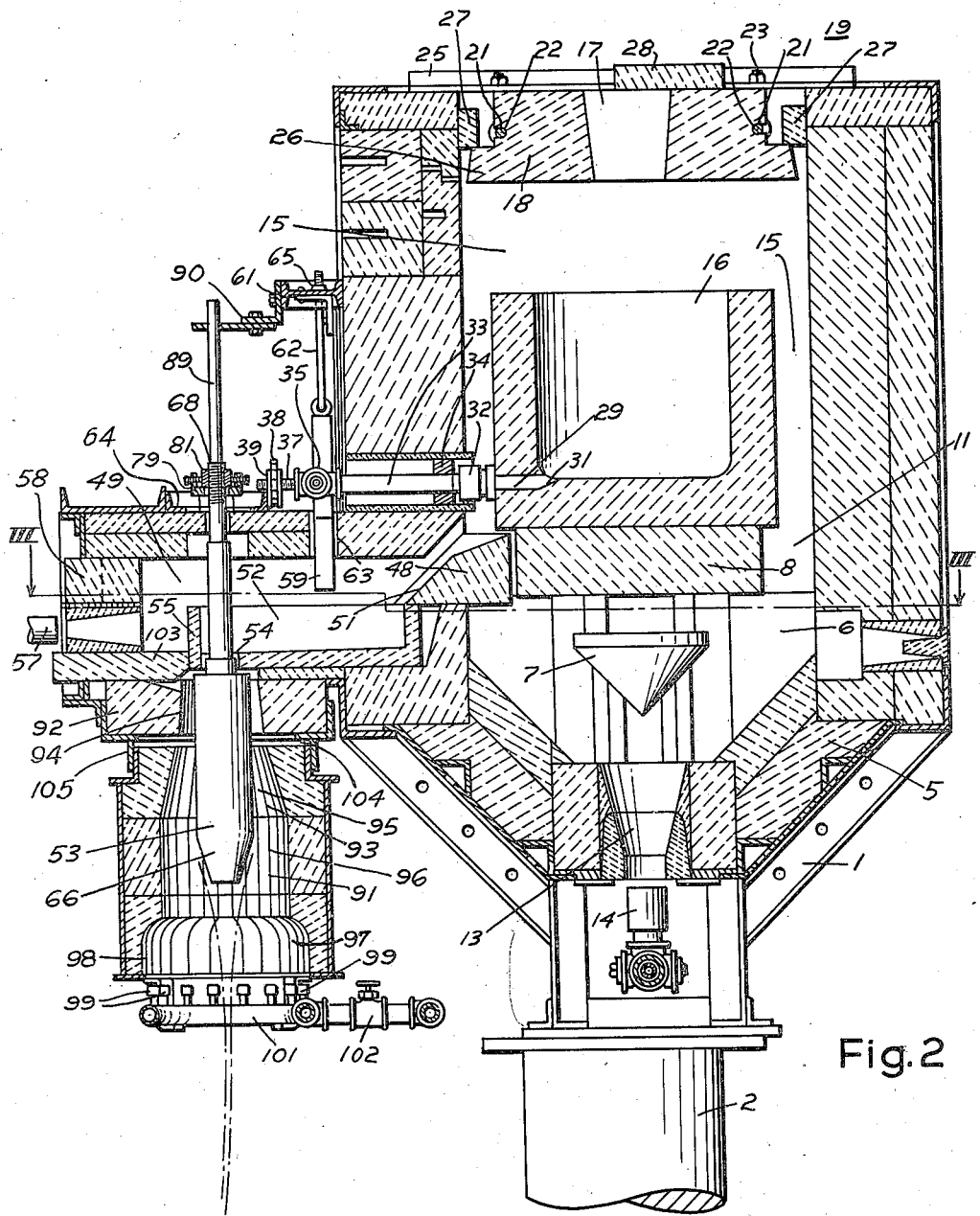
Fig. 2
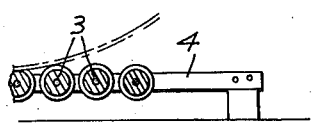
INVENTOR
Edward Danner May 20, 1947. E. DANNER 2,420,934
MANUFACTURE OF GLASSWARE
Filed Aug. 17, 1943 5 Sheets-Sheet 3

INVENTOR
Edward Danner

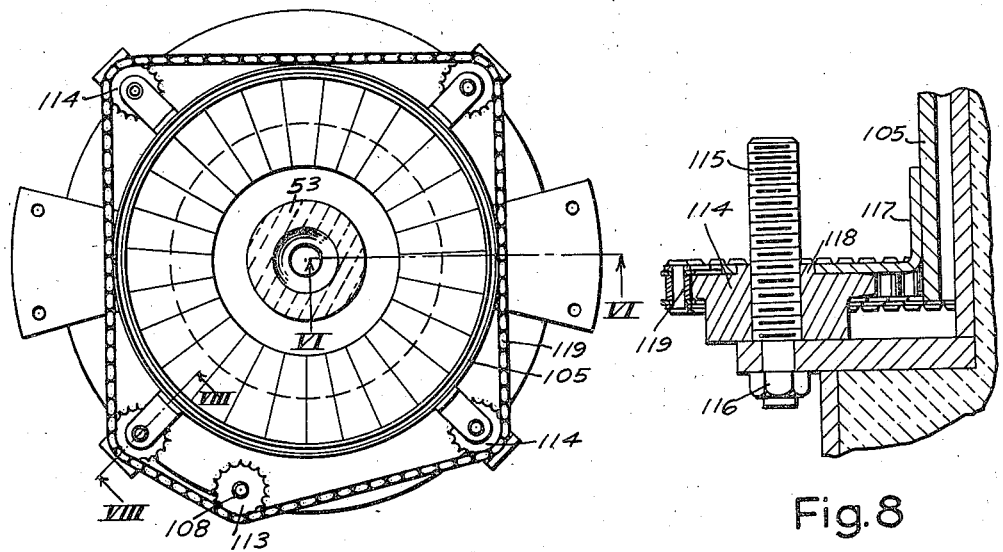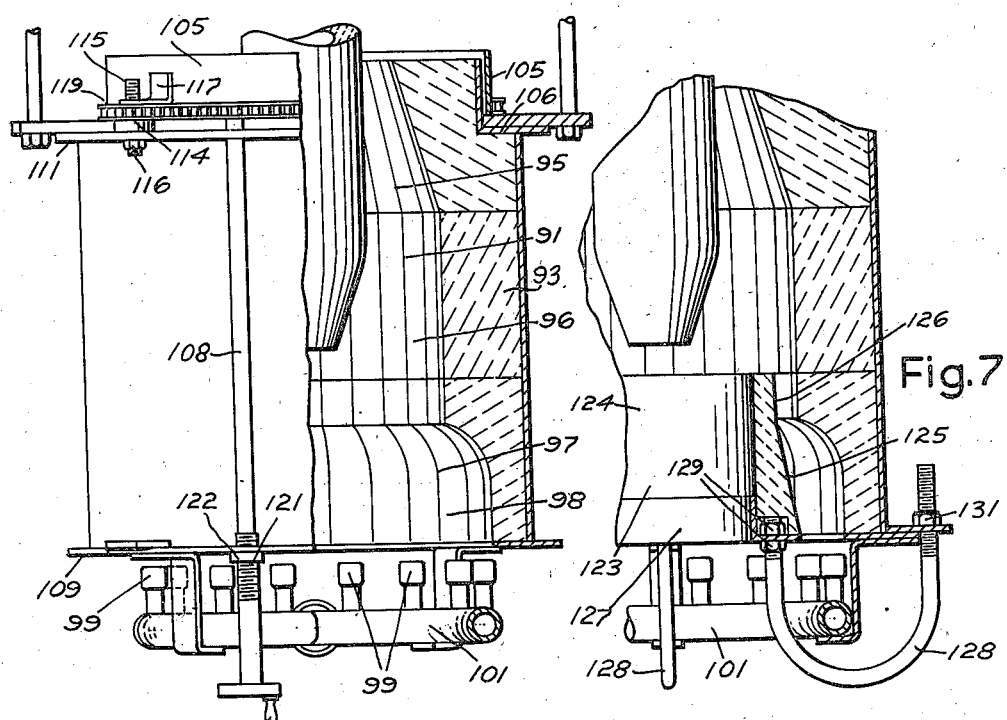

May 20, 1947.　　　　　E. DANNER　　　　　2,420,934
MANUFACTURE OF GLASSWARE
Filed Aug. 17, 1943　　　5 Sheets-Sheet 5
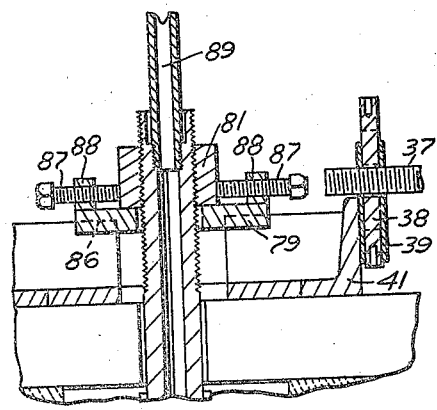
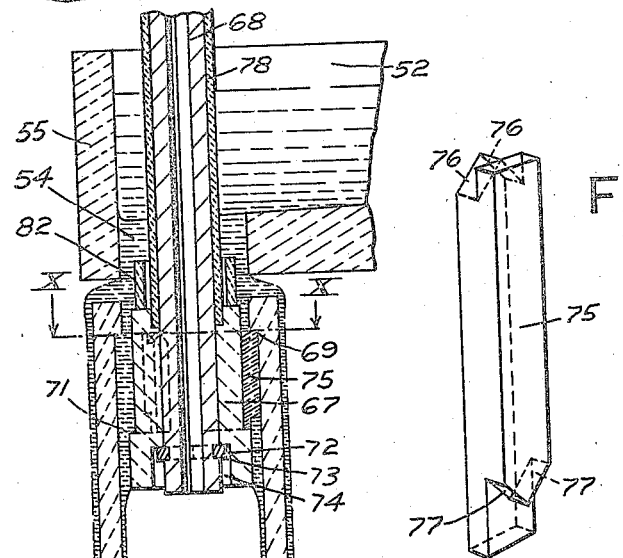
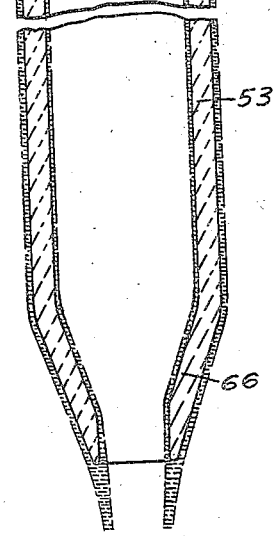
Fig. 9
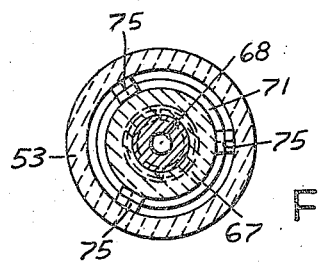
Fig. 11.
Fig. 10
INVENTOR
Edward Danner Patented May 20, 1947

2,420,934

UNITED STATES PATENT OFFICE 2,420,934

MANUFACTURE OF GLASSWARE

Edward Danner, Newark, Ohio

Application August 17, 1943, Serial No. 498,971

7 Claims. (Cl. 49—17.1)

The present invention relates to the manufacture of glassware, and more particularly to apparatus for forming hollow glassware such as glass tubing and the like. While my invention is particularly adapted to the manufacture of glass tubing having a solid cylindrical wall it is equally applicable to the manufacture of tubing formed of cellular glass and to the manufacture of tubing having other than a cylindrical configuration. However, it is described hereinafter as applied to the manufacture of ordinary tubing having a solid cylindrical wall. It is also described hereinafter as applied to the manufacture of glassware in an ordinary day-tank although it will be readily apparent that it is equally applicable to the forehearth of a continuous melting tank.

Heretofore considerable difficulty has been experienced in the manufacture of glass tubing due to the fact that drawing lines are imparted to the finished product by the shaping apparatus. It has been necessary to exercise great care in the operation of tube-making apparatus in order to minimize such drawing lines. Moreover the forming rate has been relatively slow with the result that manufacturing costs have been relatively high. This has been particularly true in respect of the manufacture of tubing having a relatively thick wall. The present invention overcomes these deficiencies of apparatus employed at the present time and provides apparatus whereby high quality tubing can be manufactured at a relatively high forming speed and at appreciably lower manufacturing costs.

The various features and advantages of my invention can be best explained by reference to the embodiments thereof disclosed in the accompanying drawings and the descriptive matter set forth hereinafter in respect thereof. It will be understood, however, that my invention is not specifically limited to the embodiments shown in the drawings, as they are merely for illustrative purposes only, and that my invention may be otherwise embodied within the scope of the appended claims.

In the drawings:

Fig. 2 is a vertical section of the furnace taken on the line II—II of Fig. 1;

Fig. 5 is a top sectional view of the part of the furnace that encloses the glass-shaping element taken along the line V—V of Fig. 1;

Fig. 6 is a section taken on the line VI—VI of Fig. 5;

Fig. 7 is a section of the adjustably supported, annular baffle having surface parts that operate to direct a heating flame with respect to the glass-shaping element;

Fig. 8 is an enlarged section taken on the line VIII—VIII of Fig. 5;

Fig. 9 is a section of one form of the glass-shaping element taken on the plane of the line IX—IX of Fig. 1;

Fig. 10 is a section of a glass-shaping element taken on the line X—X of Fig. 9; and Fig. 11 illustrates one of a plurality of spacing keys for connecting the glass-shaping element to a supporting member.

Figure 1:
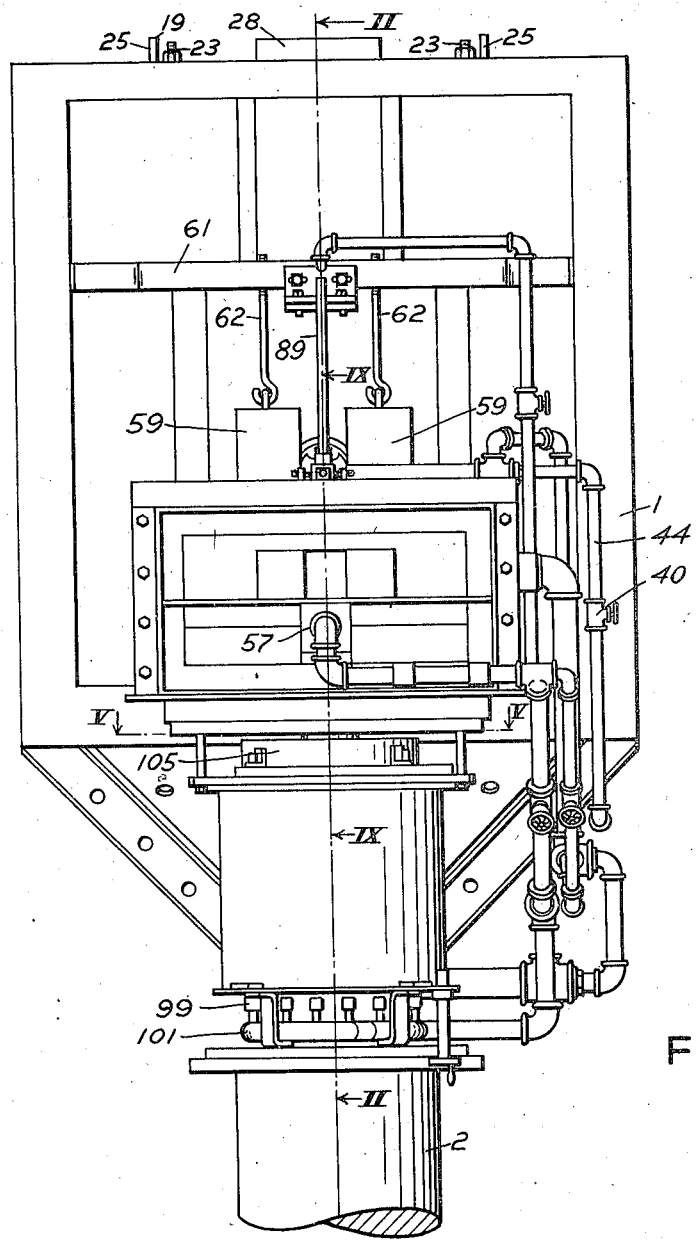
Fig. 1 is a front view of a furnace which may be used in carrying out my invention.
Figure 3:
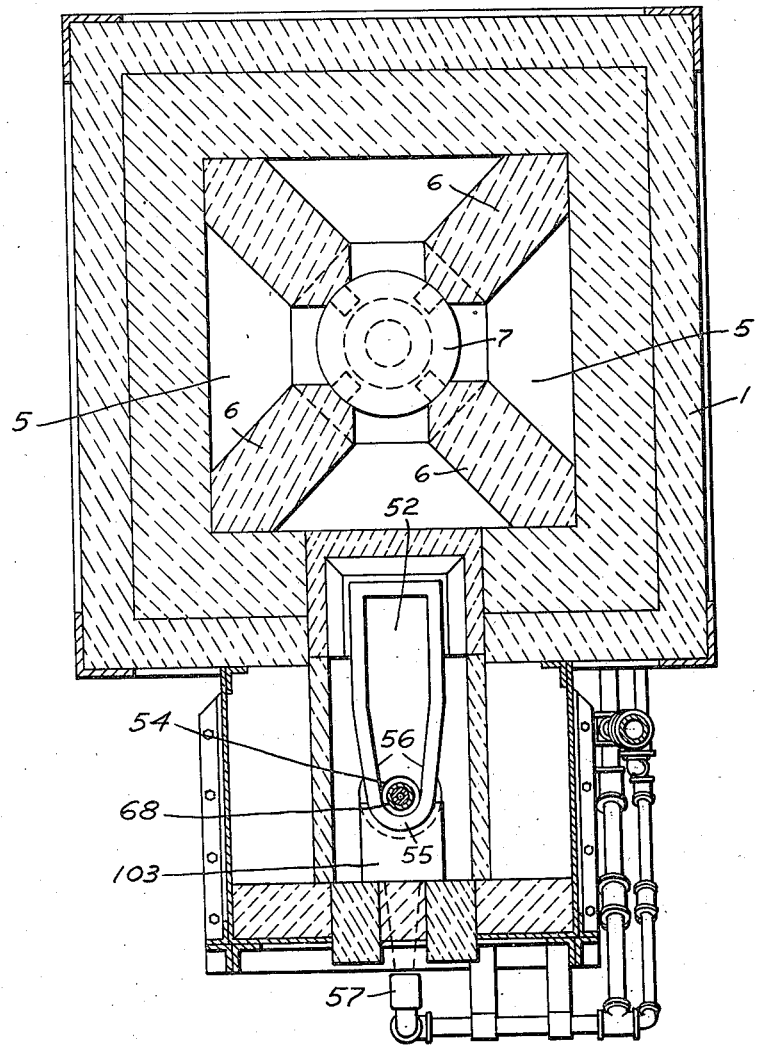
Fig. 3 is a horizontal section taken on the line III—III of Fig. 2.
Figure 4:
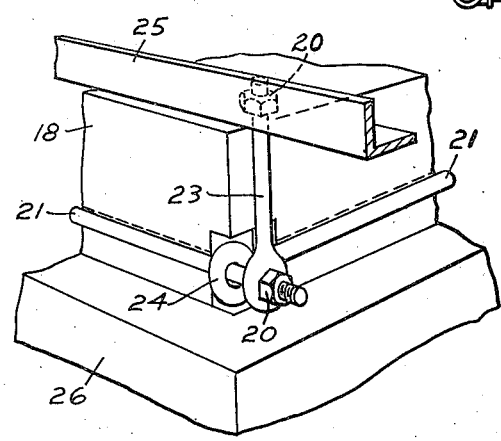
Fig. 4 shows a means for supporting the cover block of the furnace.

In the furnace shown in Figs. 1, 2, and 3, a frame 1 is formed of structural steel parts, such as I-beams, angle and channel irons, steel plates, tie rods, etc. The frame is structurally formed to support the furnace on the upper end of a hydraulically operated part 2 for raising and lowering the furnace.

Where tubing is formed from the glass heated within the furnace, it may be drawn by the weight of a part of the formed tubing from the shaping element. The tubing is directed downward to rollers 3, rotatably supported upon a supporting frame 4, and disposed horizontally and pulled over the rollers to a suitable cutting means that cuts the tubing into the desired lengths. The elevation of the furnace relative to the rollers enables variations of the weight of the glass intermediate the shaping element and the rollers which aids in the production of tubular glass of different diameters and wall thicknesses.

The walls of the furnace are formed of refractory blocks, of the type commonly used in making glass furnaces. The blocks are shaped to produce the desired structural formation of the walls and parts of the furnaces. The blocks are laid upon and tied together in position by the frame 1.

The furnace is divided into a glass-heating chamber, a glass-conveying chamber, and a glass-shaping chamber. The lower end of the furnace is provided with an inverted pyramidal bottom wall 5. A plurality of piers 6 are located on the pyramidal bottom wall and an inverted conical refractory ceramic block 7 and a container-supporting block 8 are supported on the piers 6 and located in spaced relation to each other.

A large passageway is formed intermediate the conical block 7 and bottom of the heating chamber and narrow passageways 11 are formed intermediate the sides of the supporting block 8 and the walls of the heating chamber. The bottom wall 5 of the chamber is provided with an opening 13 located below the conical block 7 and in axial alignment therewith. The diameter of the opening 13, at the inner surface of the bottom of the chamber, is larger than at the outer surface and a burner 14, for burning a suitable fuel, is disposed beneath the opening. The flame produced by the burning fuel enters the heating chamber, and the conical block 7 causes it to flare toward the passageways 11 to encompass the supporting block 8. The flame extends into the upper part 15 of the heating chamber and over the vertical side walls of the furnace.

A suitable container 16 is disposed on the block 8. The block 8 is square in cross-section and conforms to the shape of the interior of the upper part of the heating chamber. Suitable glass-forming batch mixtures are placed in the container 16 and subjected to the heat produced by the flame from the burner 14. The flame surrounds the container and effectively heats the batch mixtures and the glass. A draft opening 17 is formed in the center of the top of the furnace to remove the products of combustion and draw the flame over the sides and across the top of the container.

The top of the furnace is so formed that it may be opened readily. A cover block 18 is removably supported in the top of the furnace by a frame indicated generally by the reference character 19. The frame comprises a plurality of bars 21 that are secured in channels 22 (Fig. 2) formed in the sides of the block 18. The bars 21 are connected, at their ends, to suitable eye bolts 23 by the nuts 20 and the eyes 24 located on or formed in the ends of the bars. The bolts 23 are connected to a pair of L-bars 25 which extend across the cover block and when the cover block is located in position to close the top of the furnace, the ends of the bars are placed on the side walls to support the cover block 18 intermediate the upper parts of the walls. The block 18 is provided with flanged edge parts 26, and small blocks 27 are located on the edge parts 26 to close the space between the edges of the flanges and the side walls of the furnace.

The block 18 is provided with the relatively large draft opening 17. A slidable damper block 28 is disposed on the block 18 for regulating the effective area of the draft opening 17. The slidable damper block functions to control the draft through the furnace.

In order to remove all of the hot molten glass from the container, I have provided means for regulatively drawing the glass from the bottom of the container. The bottom of the container 16 is provided with an outlet 29. The surface of the outlet has a part 31 that slopes downward to remove all the glass from the container 16 when the outlet is open. If desired, the inner bottom surface of the container may be formed to slope toward the outlet. A hollow metal closure member 32 is supported by a suitable means in a position to open and close the outlet 29.

The closure member 32 is formed of heat-resisting metal and is interiorly threaded and screwed onto a pipe 33 that extends through the wall of the furnace. The end of the closure member has a flange 30 for preventing flow of glass outwardly over the surface of the closure member and away from the wall of the container. The flange 30 operates to direct and confine such flow of the glass downward and to the surface of the container below the closure member. The pipe 33 is supported by a refractory block 34 located within the opening, through which the pipe 33 extends into the furnace. The outer end of the pipe 33 is connected to a T-fixture 35. The closure member 32 is moved to and from the surface of the container, about the outlet 29, by means of a stud 37. The stud extends through a handwheel 38, located intermediate the sides of a frame 39. The frame is secured to a projecting part 41 of the frame of the furnace. The hub of the wheel 38 is threaded or tapped and when the wheel is rotated, it moves the stud 37 and the pipe 33, connected to the fixture 35, longitudinally, to move the closure member 32 to and from the surface of the container to close and open the outlet 29.

The closure member 32 is water-cooled to chill the glass at the edges of the outlet when the closure member is closed. The closure member 32 chills the glass contiguous to the edges of the outlet when the closure member is placed in contact with the surface of the container and congeals the glass, thus preventing the escape of the glass from the container about the edge of the closure member.

The pipe 44 is provided with a valve 49 for controlling the supply of water to the member 32 and the temperature of the closure member.

When the closure member 32 is drawn from the surface of the container to open the outlet 29, the glass flows onto a refractory block 48, located, in part, in the heating chamber and protruding therefrom into the glass-conveying chamber 49, through which the glass is conveyed to the shaping element. The block 48 has a sloping surface 51 to direct the glass into the trough 52 which is located in the chamber 49, from which the glass is directed to the upper end of the shaping element 53.

The bottom of the trough 52 is provided with an outlet 54, circular in form, and a semi-cylindrical end wall 55. The inner semi-cylindrical surface of the wall 55 forms an extension of the outlet 54. The side walls of the trough have parts 56 that are inclined toward each other, substantially as shown in Fig. 3, to progressively constrict the stream of glass, as it moves through the trough toward the outlet 54, until the stream width is substantially the same as the diameter of the outlet 54, through which the glass flows vertically downward. To further aid in free movement of the glass through the outlet and maintain uniform liquidity, a burner 57 is disposed so as to project a flame from or through the side wall 58 of the chamber 49 that axially strikes the cylindrical wall part 55 of the trough and divides and spreads over the surfaces of the inclined side wall parts 56 of the trough and, thereby, maintains relatively high temperature of the glass in the trough as it approaches the outlet from whence it is discharged onto the hollow glass-shaping element to form glass tubing. Thus, all of the glass that is directed into the trough from the container is is maintained in the direct path of the stream of glass through the trough and, consequently, none of the glass has opportunity to become highly viscous in the region of the outlet.

A pair of curtain blocks 59 are located above the trough 52 to prevent transmission of heat from the glass-heating chamber to the glass-conveying chamber to enable maintenance of different temperatures in the chambers. The curtain blocks, also, operate to deflect the flame, from the burner 57, downwardly to and over the surface of the glass in the trough. The curtain blocks 59 are suspended from an L-iron 61, secured to the frame of the furnace, by means of the rods 62. The curtain blocks extend through a slot 63 formed in the ceiling wall of the chamber 49. The ends of the rods 62 are threaded and extend through the L-iron 61, and adjusting nuts 65 are located on the upper ends of the rods and engage the upper side of the flange of the L-iron 61, whereby one or both of the curtain blocks 59 may be adjusted with reference to the trough and the surface of the glass within the trough.

The hollow glass-shaping element 53 is, in the main, cylindrical in form and is provided with a tapered end part 66. The element 53 is supported so as to locate its axis vertically and in position to intercept the glass as it flows through the outlet 54. The upper end of the glass-shaping element 53 has an upper end surface that is horizontally disposed and is located in proximity to the lower surface of the bottom of the trough.

The glass-shaping element is supported on a pipe 68 that is provided with a refractory bushing or head 67, of refractory material, which is located within the upper end of the element. The pipe 68 is adjustably mounted for moving the element with reference to the outlet to vary the space relation between the bottom surface of the trough and the upper end of the element and, consequently, to vary the effective opening of the outlet through which the glass flows from the trough onto the upper end of the element. The hollow glass-shaping element 53, at its upper end, has an inwardly extending shoulder 69, and the head 67 is disposed within the upper end of the element 53 and is provided with an outwardly extending shoulder 71. The head 67 is located on the end of the pipe 68. The pipe 68 has a circular channel 72. A split metal ring 73 is disposed in the channel to connect the head to the end of the pipe. The refractory head 67 has a socket 74 having a diameter sufficiently great to receive the metal ring 73 and retain the ring in position. The head and the pipe are then inserted within the upper end of the shaping element and to a point well below the shoulder 69 formed on the upper end of the shaping element.

In accordance with my invention the glass-shaping element is supported on the head by a plurality of replaceable, refractory, spacing keys that permit movement of a glass stream over the interior and exterior surfaces of the shaping element. The keys 75 are located intermediate the outer surface of the head 67 and the inner surface of the element 53. The thickness of the keys 75 is such as to substantially fit the annular space formed intermediate the head and the element and axially align the head and the element with the pipe. The ends of the keys 75 have surfaces that abut the shoulders 69 and 71 of the element 53 and the head 67 respectively. The ends of the keys are, also, provided with relatively inclined surfaces 76 and 77 that form wedge-shaped parts at the ends and on opposite sides of each of the keys 75. The relatively inclined surfaces 76 operate to divide the glass as it flows along the interior surface of the element, and the surfaces 77 operate to reunite the divided glass as it moves by the keys and along the inner surface of the glass-shaping element.

The pipe 68 is surrounded by a sleeve 78. The pipe 68 and its protective sleeve 78 extend through the glass in the outlet 54 and the trough, and through the chamber 49. The pipe 68 is connected to a supporting means located on the top wall of the chamber 49. The upper end of the pipe is threaded and extends through a circular plate 79, and a threaded bushing 81 is located on the end of the pipe and in contact with the plate, to adjustably and pendently support the pipe and the glass-shaping element 53. The bushing forms a nut for adjusting the position of the upper end of the shaping element with reference to the outlet 54 of the trough 52, to vary the quantity rate of flow of the glass onto the shaping element. A refractory collar 82 is located on the upper end of the head 67. The collar protrudes into the outlet 54 and affords a means for progressively varying the outflow of the glass as the element is raised or lowered by the operation of the bushing 81, but at a much more reduced ratio, proportional to the adjusting movement of the element, than would be produced by the adjustment of the upper end of the element alone with respect to the outlet.

The plate 79 is secured to the top wall 64. The top wall 64 of the chamber 49 has channel irons that form a part of the frame of the furnace, and the circular plate 79 is supported on the flange parts of the channel irons. The plate 79 is provided with recesses or notches 86, formed in the lower side of the plate, to receive corner parts of the flanges of the channel irons to hold the plate from the lateral displacement, with respect to the ceiling wall of the chamber. The plate 79 and the ceiling wall 64 have relatively large holes, through which the pipe 68 extends, to afford a required latitude for lateral adjustment of the center of the pipe 68 and its sleeve 78 to adjust the glass-shaping element 53 relative to the center of the outlet 54. The pipe is laterally adjustable by screws 87 that are disposed in ears 88 that are formed by metal parts welded to the plate 79. The screws are rotated to engage the sides of the bushing 81 and laterally adjust the bushing relative to the plate and the upper end of the shaping element 53 relative to the outlet 54 and clamp the bushing in its adjusted position to secure the upper end of the glass-shaping element 53 in its adjusted position, both vertically and laterally, with reference to the outlet.

A pipe 89 is connected to a source of supply of air under pressure and to the upper end of the pipe 68, whereby air under pressure is directed to within the tubular glass as it is drawn from the glass-shaping element. This operates to counteract the surface tension of the glass as it leaves the tapered end 66 of the element, and, also, to control the size of the tubing. The pipe 89 extends within the pipe 68 and through a bracket 90 secured to the frame of the furnace. The bracket coacts with the bolts to laterally adjust the mandrel.

The glass-shaping element 53 is supported in the glass-shaping chamber 91. The chamber 91 is formed by a block 92 having a centrally disposed opening 94 therein, in which the upper end of the glass-shaping element is positioned, and by a shell 93 located below and spaced from said block. The shell 93 has an inner conical surface 95 surrounding the central part of the element, a cylindrical surface 96 surrounding the lower end part of the element, and an outwardly curved surface 97 located below the lower end of the element terminating in a cylindrical surface 98 located at the lower end of the wall.

Adjacent the lower end of the wall there is a plurality of burners 99 connected to an annular pipe 101, through which fuel is fed to the burners 99. The flow of gas is controlled by the valve 102. Consequently, when the fuel is ignited, a flame is projected toward the lower end of the refractory wall 92. The flame extends within the shell and the flaming gases move to the lower edges of the concave surface 97 and are turned inward, toward the axis of the element 53, at a point well below the element, to heat the air that enters within the area defined by the burners. The flame is constricted by the conical surface 95, to contact the surface of the glass on the upper part of the element and is closely confined to the element, within the surface 94 that closely surrounds the upper end of the element, to more intensely heat the glass on the upper end of the element. The heat reaches its maximum intensity on the upper end of the shaping element by reason of the close confinement of the burning gases at its surface 94.

If desired, a slidable block 103 may be located below the burner 57 and on the upper end of the wall 92. The block 103 protrudes outwardly beneath the burner to enable the manipulation of the block. The block forms a part of a dividing wall between the glass-shaping chamber 91 and the glass-conveying chamber 49 and may be removed to form a peep-hole to permit viewing of the glass as it is delivered from the trough.

As stated above, the shell 93 is spaced from the block 92, thereby providing a substantially circular port 104 through which gases passing through the shell are exhausted. To regulate the area of radiation of the heat of the flame toward the element, a sheet metal cylindrical damper 105 is located upon a shoulder 106 formed upon the upper part of the shell 93. The upper part of the shell 93 is cylindrical in shape and is adapted to permit vertical movements of the damper 105 with reference to the substantially annular port 104, to restrict to the desired extent the upward projection of the flame within the wall, and provide a uniformly regulated outflow of the gases from the chamber. Cooling air is drawn into the chamber through the large area defined by the location of the burners and this has the effect of lowering the temperature of the glass on the lower end of the glass-shaping element. By means of the damper 105 the temperature of the glass on the shaping element can be regulated to suit operating conditions. By adjusting the damper the heating of the glass or the rate at which it cools as it passes over the shaping element can be regulated. Also, by regulating the amount of gas supplied to the burners the temperature of the glass on the shaping element may be controlled in accordance with the requisite operating conditions.

The damper 105 is, preferably, operated at a point near the burners 99. The damper 105 and the fuel quantity may be varied to produce the desired distribution of heat over the glass located on different parts of the glass-shaping element, as may be indicated by the glass movement from the element.

In the embodiment illustrated, the damper is actuated by rotation of a rod 108 that extends through laterally extending flange parts 109 and 111 of the frame of the furnace. The rod is provided with a suitable handle 112 at its lower end and a sprocket wheel 113 is keyed to its upper end. A plurality of sprocket wheels 114 are located on the shoulder 106 of the shell 93. A plurality of studs 115 are secured to the flange 111 by means of the nuts 116. The sprocket wheels 114 are threaded to receive the studs and, when the sprocket wheels 114 are rotated, they rise and descend on the studs. The damper 105 is supported on the sprocket wheels 114 by means of the brackets 117 that are connected to the damper and contact with the upper surfaces of the sprocket wheels 114. Each sprocket wheel is provided with a hub 118 that extends upwardly into or through each bracket 117. The sprocket wheels 114 are connected to the sprocket wheel 113 by the sprocket chain belt 119. Rotation of the rod 108 and the sprocket wheel 113 causes rotation of the sprocket wheels 114 and, consequently, causes simultaneous movements of the sprocket wheels 114 along the studs 115 and movement of the damper 105 to open or close the circular port 104. Also, as the sprocket wheels 114 are raised and lowered by the operation of the rod 108, the chain 119 is raised and lowered, and to enable the sprocket wheel 113 to follow the movements of the chain, the rod 108 is provided with a threaded part 121, and a nut 122, which is welded to the flange 109, operates to raise and lower the rod 108 and the sprocket wheel 113 with the chain.

Thus, the damper 105 may be adjusted with reference to the port 104 to vary the draft or movement of the gases, namely, air and ignited fuel gases, through the glass-shaping chamber 91. The damper 105 may, also, be adjusted to vary the amount of the neutral gases of the exhaust products held within the upper end of the chamber to limit the area of the glass-forming element that the flame encompasses and, also, to limit the movement of the air into the chamber and produce a substantially uniform temperature about the glass-shaping element.

In Fig. 7 I have shown a baffle which coacts with the contour of the inner surfaces of the chamber 91 to restrict the cross-sectional area of the flaming gas and to direct the flame with respect to the interior of the chamber, and, if desired, to limit the more intense heat within a definite part of the chamber. A baffle 123, having an inner cylindrical surface 124 and outer conical and cylindrical surfaces 125 and 126 is disposed within the lower end of the chamber 91. The conical surface 125 of the baffle is disposed substantially in opposed relation with reference to the concave surface 97. The cylindrical surface 126 may extend above the upper edge of the concave surface 97 to locate the cylindrical surface 126 in opposed relation to the cylindrical surface 96 of the wall, which directs the flame along the cylindrical surface 96 to the conical surface 95. When the damper 105 is in an open position, the flame will extend upwardly toward the upper end of the glass-shaping element to a greater extent than when the damper is closed. The variation of the extent of the projection of the flame may be produced by adjusting the baffle with reference to the parts of the inner surface of the lower end part of the chamber.

The baffle 123 is supported on an annular L-shaped iron 127, to which a plurality of U-bars 128 are connected by the nuts 129. The baffle is adjustably secured to the flange 109 at the outer ends of the U-bars. The outer end of each U-bar 128 is threaded. Preferably, the threads on the outer ends of the U-bars are of considerable length to provide a considerable latitude of adjustment of the baffle 123. Nuts 131 are located on the outer ends of the U-bars and engage the upper surface of the flange 109 of the frame of the furnace. Thus, the baffle may be raised and lowered to locate the upper end edge of the baffle 123 either well above or well below the upper edge of the concave surface 97 and at any intermediate positon, which, in conjunction with the adjustment of the damper 105, enables distribution of the flame and gases over the full length of the glass-shaping element 53 or any part thereof, to produce the desired fluidity and movement of the glass over the surface of the element.

It will be apparent from what has been stated above, and particularly in reference to the embodiments shown in Figs. 2, 6, 7 and 9, that glass flow is obtained on the inner and outer surfaces of the hollow glass-shaping element. The two streams of glass converge at the ware-forming point at the lower end of the shaping element to form the tubing. As the molten glass flows downwardly along the inner and outer surfaces of the shaping element, it cools to such an extent that when it leaves the ware-forming point it will retain the approximate shape which has been imparted to it by the shaping element. I have found that the tendency of the glass to devitrify can be minimized by maintaining a temperature differential between the glass flowing over the inner and outer walls of the shaping element. It is generally preferable that the film of glass passing downwardly along the inner wall of the shaping element be thinner than the film passing along the outer wall of the shaping element and that this inner, thinner film be at a higher temperature than the outer, thicker film adjacent the lower end of the shaping element and where the two films are joined together. In apparatus of the character described above in which the two films are formed and then joined together at the ware-forming point, I have found that such a temperature differential can be obtained and maintained during operations. The most desirable temperature differential will depend in large measure upon the character of the glass employed.

The tendency toward devitrification or crystallization of the glass on the surface of the mandrel is more marked in the case of hard neutral glasses than is the case in respect of the softer glasses. In the forming of tubing from hard neutral glasses the molten glass may be at a temperature of approximately 1100° to 1200° C. when discharged from the tank or forehearth onto the top of the shaping element. At the top of the shaping element the glass on the inside is at approximately the same temperature as that on the outside. As the glass moves downwardly along the shaping element, the film on the outside of the shaping element cools more quickly than the film on the inside thereof and when the glass reaches the bottom of the shaping element and the two films are joined together there is a temperature difference of approximately 25° to 125° C. A temperature difference of this order has been found desirable and to tend to minimize devitrification. Of course, the temperatures stated are for hard neutral glasses, and other temperature differentials and ranges of temperature differentials will be applicable where other types of glasses are employed. A relatively small temperature differential will give desirable results in many cases.

The present application is a continuation-in-part of my co-pending application Serial No. 235,300, filed October 17, 1938.

While I have shown and described several embodiments of my invention, it will be understood that is it not limited to the particular embodiments or conditions described but may be otherwise embodied or employed within the scope of the claims appended hereto.

I claim:

1. In glassware-forming apparatus, a glass-shaping element, a source of molten glass arranged to deposit molten glass on said shaping element, a shell surrounding said glass-shaping element and forming a chamber in which the glass-shaping element is positioned, said chamber having a gas discharge opening adjacent the upper end thereof, a damper ring adjacent said opening for regulating the flow of gases through said chamber, and means for adjusting the damper ring relative to said opening.

2. In glassware-forming apparatus, a glass-shaping element, a source of molten glass arranged to deposit molten glass on said shaping element, a shell surrounding the major portion of said shaping element and adapted to form a chamber within which the shaping element is positioned, said chamber having at least one gas discharge opening adjacent the upper end thereof, means for supplying heated gases to said chamber adjacent the lower end thereof, a damper ring adjacent said gas discharge opening, and means for adjusting the damper ring relative to the opening for regulating the flow of gases through said shell and around said shaping element.

3. In glassware-forming apparatus, a shaping element, means including a member having an orifice therein for directing molten glass to the upper portion of the element and over the surface thereof, a shell surrounding the major portion of the shaping element, means for supporting the shell to locate the upper end thereof in spaced relation to said orificed member and for forming an annular opening between said member and the upper end of the shell, burners for supplying heated gases to said shell, a damper ring surrounding said annular opening, and means for raising and lowering the ring to vary the effective area of the opening between said member and the shell for controlling the flow of said heated gases within the shell and the contacting thereof with the surface of the glass on the shaping element.

4. In glassware-forming apparatus, a glass-shaping element, means including a member having an orifice therein for directing molten glass to the upper portion of the shaping element, a shell surrounding at least a part of said shaping element, means for supporting the shell to position the upper end thereof in spaced relation with respect to said orificed member, whereby an annular opening is formed between said member and the shell, a damper ring cooperating with said annular opening, and means for adjusting the damper ring and shell relative to each other to regulate the flow of gases through the shell.

5. In glassware-forming apparatus, a shaping element, means including a member having an orifice therein for directing molten glass to the upper portion of the element and over the surface thereof, a shell surrounding the major portion of the shaping element, means for supporting the shell to locate the upper end thereof in spaced relation to said orificed member and for forming an annular opening between said member and the upper end of the shell, burners for supplying heated gases to said shell, a damper ring positioned adjacent and arranged to cooperate with said annular opening, and means for raising and lowering the ring to vary the effective area of the opening between said member and the shell for controlling the flow of heated gases within the shell and the contacting of the gases with the glass on the shaping element.

6. In glassware-forming apparatus, a source of molten glass, means including a member having a substantially circular orifice therein for flowing and depositing molten glass, a glass shaping element, means for supporting the glass shaping element below and in alinement with said orifice, whereby molten glass is received by the shaping element from said orifice, a shell surrounding the glass shaping element and arranged to form a chamber within which the shaping element is positioned, said shell being open at the lower end and being spaced from the member having the orifice through which glass is deposited on the shaping element, an adjustable regulating damper positioned adjacent the opening between the shell and said member, and means for adjusting the damper relative to said opening for controlling the flow of gases through said shell.

7. In glassware-forming apparatus, a glass shaping element, means including a member having an orifice therein for directing molten glass to the upper portion of the element and over the surface thereof, a refractory shell surrounding the major portion of the shaping element, means for supporting the shell to locate the upper end thereof in spaced relation with respect to said orificed member and for forming an annular opening between said member and the upper end of the shell, a damper ring, means for supporting said damper ring adjacent said annular opening, a heat deflecting annular member, means for adjustably supporting said member within said shell and adjacent to but nevertheless spaced from the shaping element, and a burner located near the lower end of said shell, the burner, shell and annular member being arranged to direct heated gases toward the lower end of the shaping element.

EDWARD DANNER.

REFERENCES CITED

The following references are of record in the file of this patent:

UNITED STATES PATENTS

| Number | Name | Date |
|---|---|---|
| 2,329,164 | Stuckert et al. | Sept. 7, 1943 |
| 2,013,451 | Stewart | Sept. 3, 1935 |
| 1,219,709 | Danner | Mar. 20, 1917 |
| 2,131,417 | Danner | Sept. 27, 1938 |
| 1,261,367 | Danner | Apr. 2, 1918 |

FOREIGN PATENTS

| Number | Country | Date |
|---|---|---|
| 612,120 | France | July 24, 1926 |
| 336,460 | Great Britain | Oct. 16, 1930 |
| 750,425 | France | May 29, 1933 |
| 336,460 | Great Britain | Oct. 16, 1930 |